Nov. 17, 1959  L. PETERSEN  2,913,237
APPARATUS FOR COOLING FINELY DIVIDED MATERIALS
Filed Aug. 7, 1956
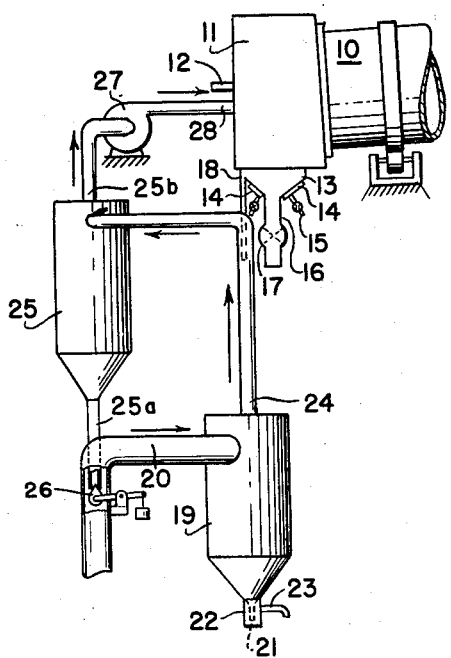
INVENTOR
Louis Petersen
by
Pennie Edmonds Morton Barrows Taylor
ATTORNEYS

United States Patent Office 2,913,237
Patented Nov. 17, 1959

2,913,237

APPARATUS FOR COOLING FINELY DIVIDED MATERIALS

Louis Petersen, Rye, N.Y., assignor to F. L. Smidth & Co., New York, N.Y., a corporation of New Jersey Application August 7, 1956, Serial No. 602,553

1 Claim. (Cl. 263—32)

This invention relates to the cooling of materials, which have been heated to a high temperature in roasting, calcining, and like operations, and is concerned more particularly with a novel cooling apparatus for use in the cooling of hot material, which has been reduced to finely divided condition as a result of being burned. Materials of the kind referred to include alumina, magnesia, kieselguhr, etc., and, since all the advantages of the invention are realized in the application of the invention to the cooling of calcined alumina, a form of apparatus embodying the invention and suitable for such use will be illustrated and described in detail for purposes of explanation.

The cooling of hot alumina burned in a rotary kiln has heretofore commonly been carried on in rotary coolers and in coolers, which include cooling chambers mounted in planetary arrangement on the kiln near its lower end. In such coolers, the cooling is effected by the passage of air in contact with the material and the air, which has taken up heat from the material, is then conducted into the kiln to take part in the burning operation. Calcined alumina is of such fineness that it is readily entrained in the stream of cooling air and, as a result, when coolers of the rotary and planetary chamber types are used, the kiln becomes so dusty that it is difficult to control the burning of the fuel to obtain the desired economy. Another disadvantage of such coolers is the high cost of installation and the loss of heat by radiation. Rotary coolers are also expensive to maintain and operate.

The present invention is, accordingly, directed to the provision of a novel cooling apparatus, which is suitable for the cooling of hot material of great fineness and overcomes the disadvantages of the prior coolers above mentioned. In the new apparatus, the material issuing from the burning chamber or kiln is introduced into an air stream and carried in suspension in the air to a separator, in which the cooled material is separated from the heated air. If desired, further cooling may be effected by introducing the material a second time into an air stream for suspension and cooling therein or the material from the separator may be transferred to and passed through a cooler of the fluid-bed type.

For a better understanding of the invention, reference may be made to the accompanying drawing, the single figure of which is a diagrammatic elevational view of a form of cooling apparatus embodying the invention employed in connection with a rotary kiln.

The installation shown in the drawing includes a rotary kiln 10 having a hood 11, into which the lower discharge end of the kiln projects, and a burner pipe 12 extends through the hood 11 and into the end of the kiln. The hot burned material issuing from the kiln falls into a separating device 13 at the bottom of the hood and the device is provided at its lower end with downwardly convergent aerating chambers 14, which have porous inner walls and are supplied with air under pressure by pipes 15. An outlet 16 containing a rotary gate valve 17 leads from the bottom of the device between the aerating chambers and an overflow pipe 18 leads from the device 13 above the aerating chambers.

In the operation of the device, the finely divided burned material entering the device is rendered fluent by air diffused into it through the porous walls of the aerating chambers, while oversize components, such as lumps and pieces of the kiln lining, sink through the body of fluent material and enter the outlet 16, from which they are discharged by rotation of the valve 17. The fluidized material continually issues from the device 13 through the pipe 18.

A cyclone separator 19 is mounted adjacent the kiln and has an air inlet, to which a pipe 20 is connected. The separator has an outlet for air at its top and an outlet for solids at its bottom and the solids outlet is provided with a fluidized seal. For this purpose, the separator has an outlet pipe 21 entering a chamber 22 having means for aerating the material entering it, and the chamber has an outlet pipe 23 at a level above that of the lower end of pipe 21. With this arrangement, the chamber 22 contains a quantity of material above the lower end of pipe 21 and the material prevents the entrance of atmospheric air into the separator.

A pipe 24 leads from the air outlet of separator 19 to the air inlet of a separator 25, which has a solids outlet at its bottom. A pipe 25a leading from the outlet conducts material collecting in the separator into the pipe 20 and pipe 25a has a seal discharge device, including a weighted gate, at its lower end. The separator 25 has an air outlet at its top connected by a pipe 25b to the intake of a fan 27 having its outlet connected by a pipe 28 to the hood 11. The overflow pipe 18 from the separating device 13 extends into pipe 24, so that the material from the device is discharged into the stream of air traveling from separator 19 to separator 25.

In the operation of the installation shown, the finely divided material is freed from oversize components in the separating device 13 and enters and is suspended in the stream of air traveling from separator 19 to separator 25. The material is preliminarily cooled while being carried in suspension in the air stream traveling through pipe 24 and also in separator 25 and the material issuing from the solids outlet of separator 25 is conducted by pipe 25a into the stream of fresh air, which is traveling through pipe 20 to separator 19. The material is carried in suspension in the air stream and enters separator 19, where the solids are separated from the air and discharged through the fluid seal at the outlet of the separator. The air travels from separator 19 through pipe 24 and, after issuing through separator 25, passes through the fan and enters the kiln to serve as secondary air of combustion. In the installation, the finely divided hot material is cooled in two stages while being conveyed in suspension in air and the air used for cooling purposes and heated in the process is utilized in the kiln, so that a good heat recovery is obtained. If desired, part of the air being discharged by fan 27 may be used in the fuel-primary air mixture.

In the installation described, the hot material from the separating device 13 is suspended in a stream of air and is first separated from the stream in separator 25. The material issuing from the separator 25 is again suspended in an air stream and subjected in the separator 19 to a second separation operation. In the appended claim, the separator 25 is referred to as the "first separator" and the separator 19 as the "second separator."

This application is a continuation-in-part of my co-pending application Serial No. 477,341, filed December 23, 1954, now Patent 2,841,384.

I claim:

In combination with a kiln discharging hot burned material in finely divided condition and heated by a fuelair mixture burned in the kiln, a first separator, a second separator, a conduit leading to said second separator, a conduit connecting said separators, a conduit connecting said first separator to the kiln, means for causing a stream of air to flow successively through the conduit leading to said second separator, the second separator, the conduit connecting said separators, the first separator and then through the conduit connecting the first separator with the kiln for use in the combustion of fuel in the kiln, means for introducing substantially all of the hot material discharged from the kiln into the stream of air passing through the conduit connecting said separators to be carried along in said stream to said first separator and to be cooled in transit, and means for introducing material separated in said first separator into the stream of air flowing through the conduit leading to said second separator to be carried thereby into said second separator.

References Cited in the file of this patent

UNITED STATES PATENTS

| | | |
|---|---|---|
| Re. 17,212 | Stockton | Feb. 12, 1939 |
| 2,522,639 | Royster | Sept. 19, 1950 |
| 2,587,378 | Petersen | Feb. 26, 1952 |
| 2,663,560 | Muller et al. | Dec. 22, 1953 |
| 2,756,981 | Muller | July 31, 1956 |